No. 613,975. Patented Nov. 8, 1898.
G. W. DAVIS & E. E. EGGLESTON.
BEET HARVESTER.
(Application filed Nov. 20, 1897.)
(No Model.) 7 Sheets—Sheet 1.
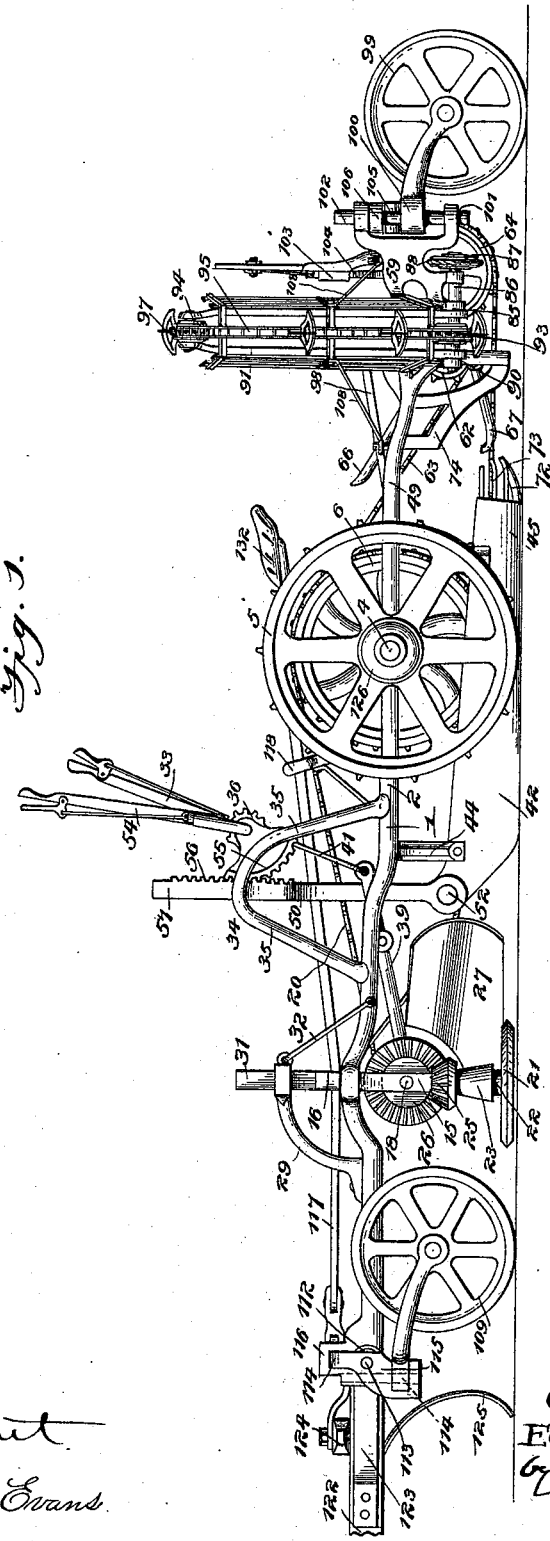
Witnesses
C. E. Hunt
Victor J. Evans
Inventors
George W. Davis
Eugene E. Eggleston
by V. D. Stockbridge
Their Attorney.

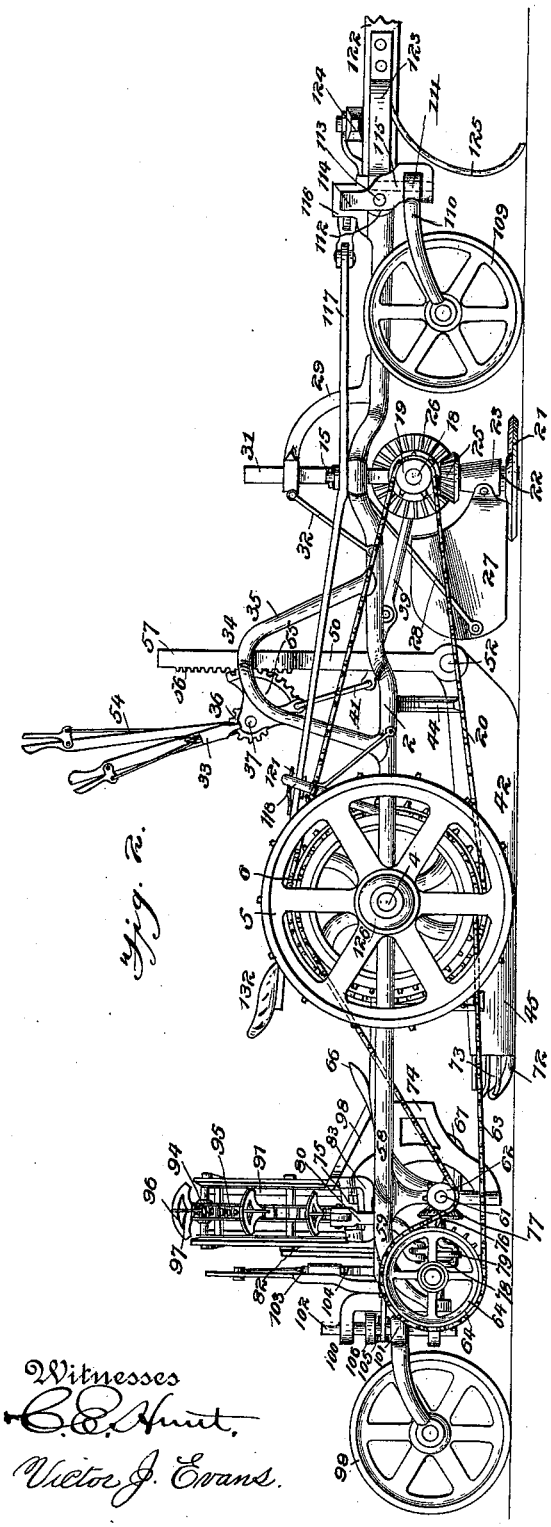

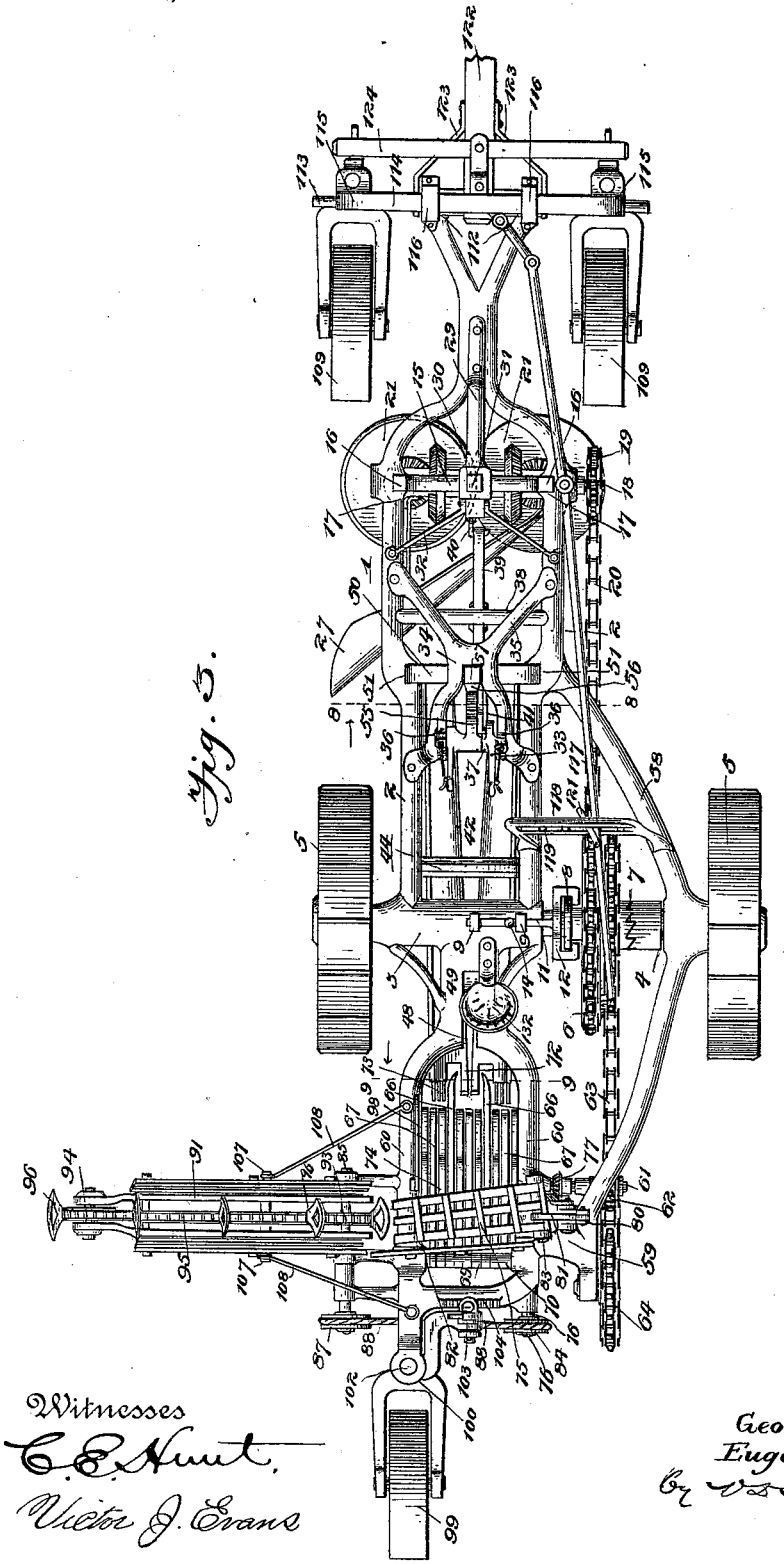

No. 613,975. Patented Nov. 8, 1898.
G. W. DAVIS & E. E. EGGLESTON.
BEET HARVESTER.
(Application filed Nov. 20, 1897.)
(No Model.) 7 Sheets—Sheet 4.
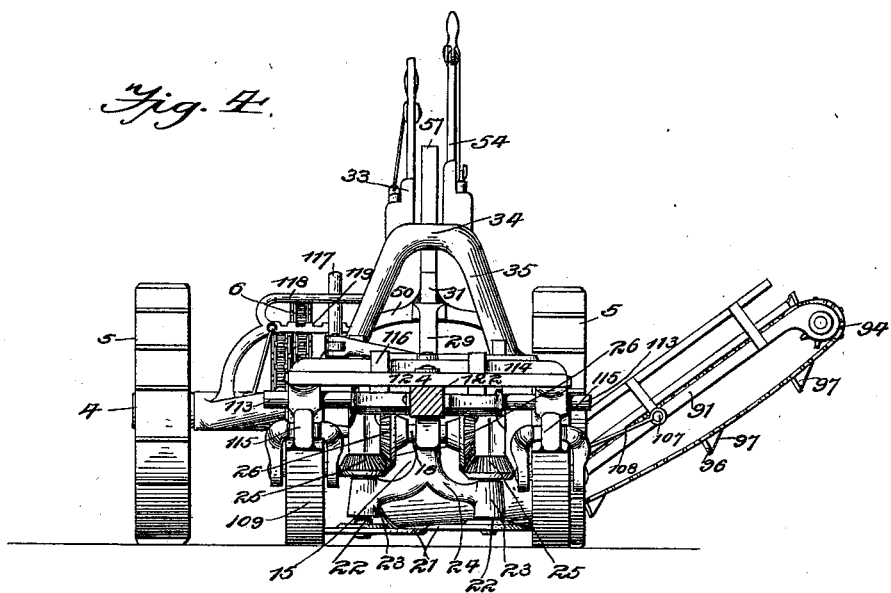
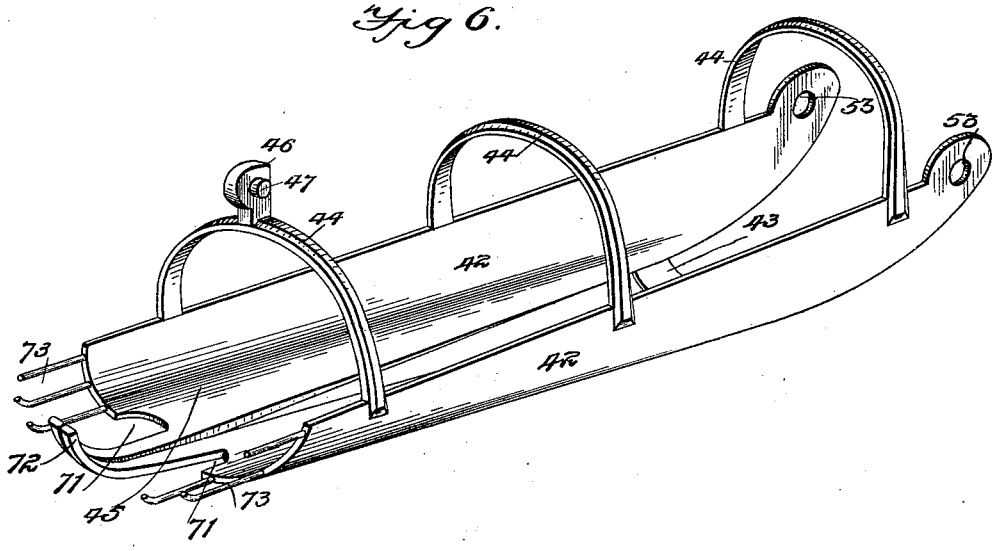

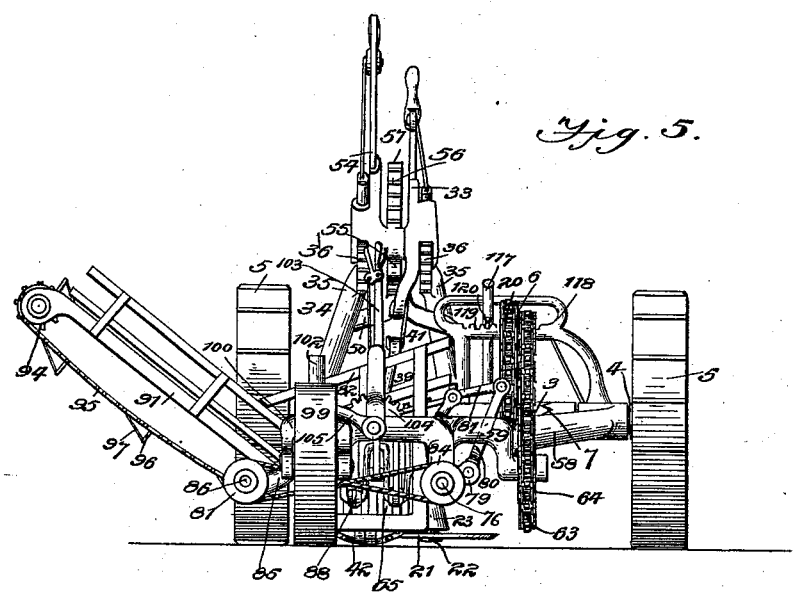

No. 613,975. Patented Nov. 8, 1898.
G. W. DAVIS & E. E. EGGLESTON.
BEET HARVESTER.
(Application filed Nov. 20, 1897.)
(No Model.) 7 Sheets—Sheet 6.
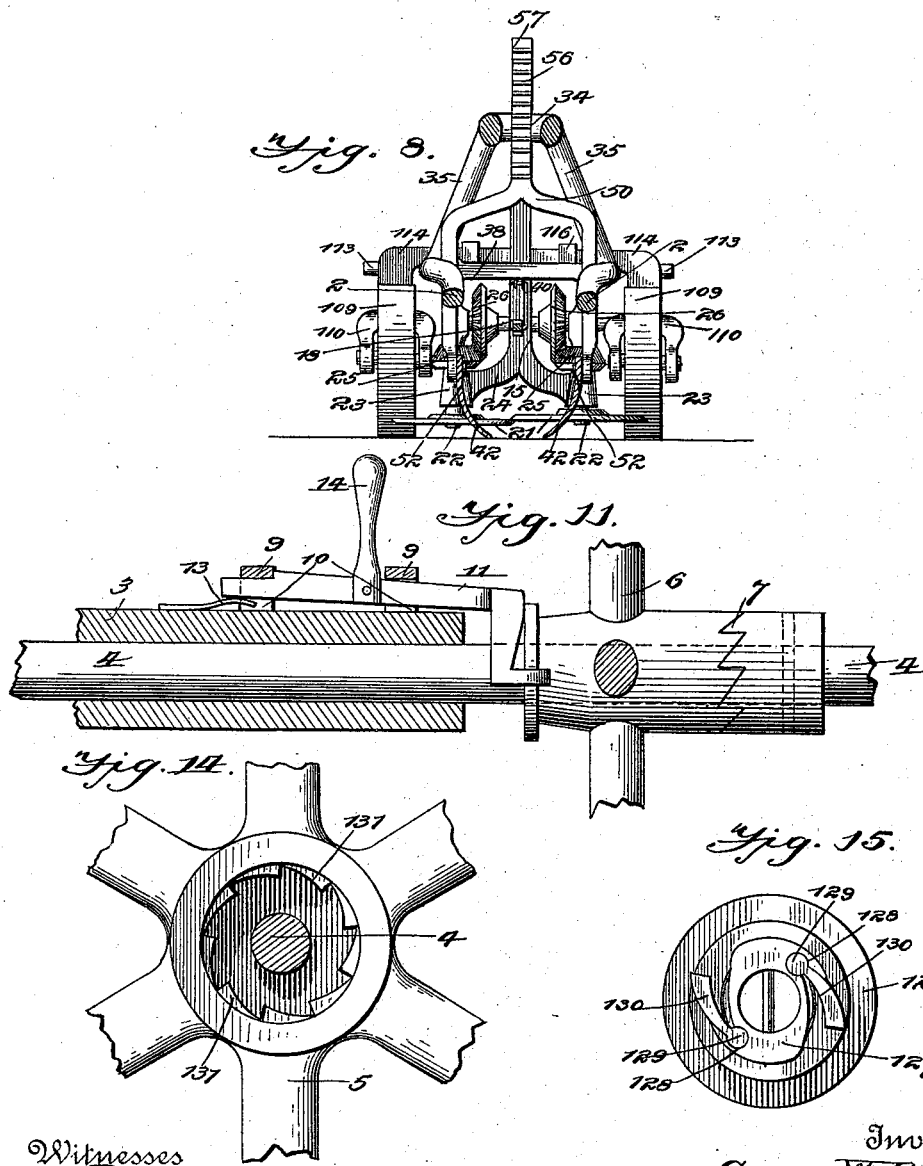

No. 613,975. Patented Nov. 8, 1898.
G. W. DAVIS & E. E. EGGLESTON.
BEET HARVESTER.
(Application filed Nov. 20, 1897.)
(No Model.) 7 Sheets—Sheet 7.

Witnesses
Inventors
George W. Davis,
Eugene E. Eggleston,
Their Attorney.

UNITED STATES PATENT OFFICE.

GEORGE W. DAVIS AND EUGENE E. EGGLESTON, OF CRESTON, NEBRASKA; SAID DAVIS ASSIGNOR OF PART OF HIS RIGHT TO CHRIS T. PETERSON, OF PLATTE, NEBRASKA.

BEET-HARVESTER.

SPECIFICATION forming part of Letters Patent No. 613,975, dated November 8, 1898.

Application filed November 20, 1897. Serial No. 659,271. (No model.)

*To all whom it may concern:*

Be it known that we, GEORGE W. DAVIS and EUGENE E. EGGLESTON, citizens of the United States, residing at Creston, in the county of Platte and State of Nebraska, have invented certain new and useful Improvements in Beet-Harvesters; and we do hereby declare the following to be a full, clear, and exact description of the invention, such as will enable others skilled in the art to which it appertains to make and use the same.

This invention relates to improvements in vegetable-harvesters, and more particularly relates to machines for harvesting beets.

To this end the main and primary object is to provide a machine of the character mentioned embodying in its construction efficient means for topping the beets or removing the leaves therefrom and means for pulling or lifting the beets from the ground, and, further, to provide means whereby after the beets have been topped and removed from the ground the same shall be conveyed to a wagon or the like and boxed therein.

A further object of the invention is to so construct a vegetable-harvester that the various parts thereof shall operate freely and with the least expenditure of power necessary for such operation and to so arrange the parts that the same shall be under the control of a single operator.

With these and other objects in view, which will appear as the nature of the improvements is better understood, the invention consists, substantially, in the novel construction, combination, and arrangement of parts, as will be hereinafter fully described, illustrated in the accompanying drawings, and pointed out in the claims hereto appended.

Figure 9:
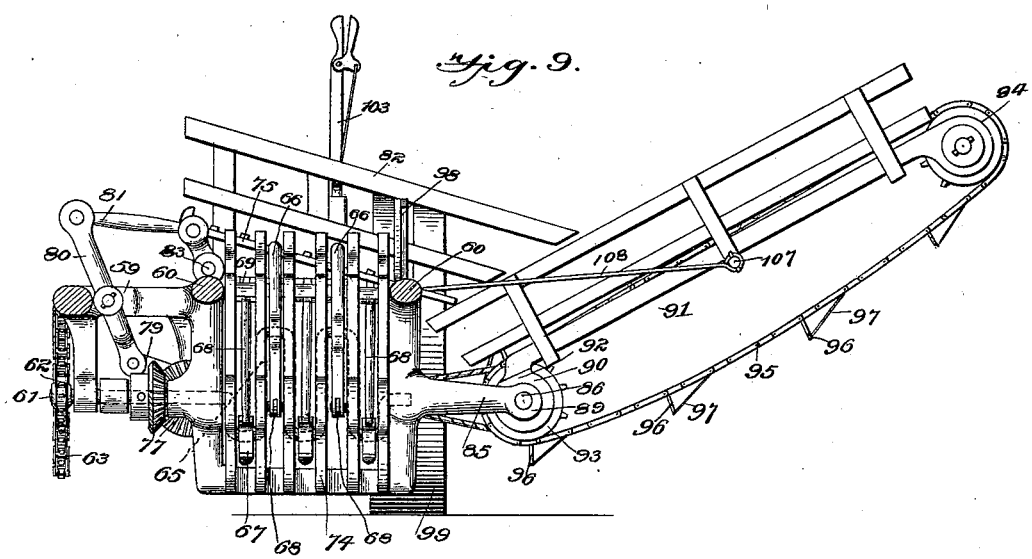
Figure 10:
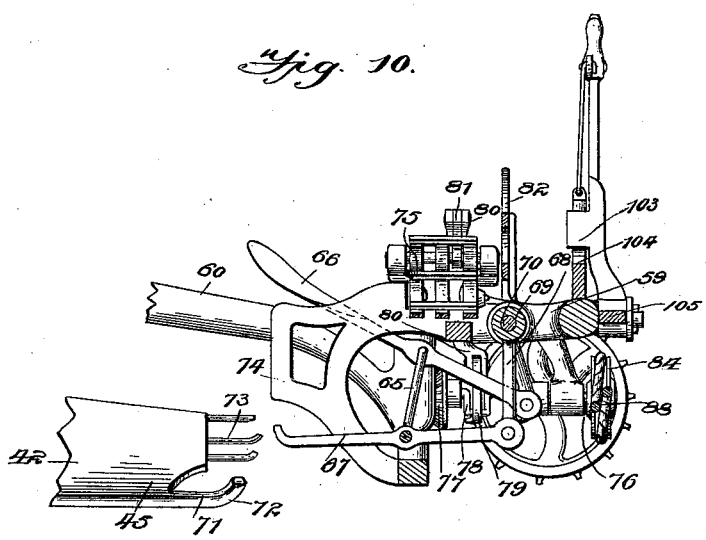

In the drawings, Figure 1 is a side elevation of a vegetable-harvester constructed in accordance with this invention. Fig. 2 is a similar view looking at the side of the machine opposite to that shown in Fig. 1. Fig. 3 is a top plan view. Fig. 4 is a front end elevation. Fig. 5 is a rear end elevation. Fig. 6 is an enlarged perspective view in detail of the means for pulling the vegetables from the ground, the means for adjusting the same not being shown. Fig. 7 is a plan view thereof. Fig. 8 is a transverse sectional view on the line 8 8, Fig. 3. Fig. 9 is a similar view taken on the line 9 9, Fig. 3, and looking toward the loading mechanism. Fig. 10 is a longitudinal sectional view taken through the loading mechanism. Fig. 11 is a detail sectional view illustrating the means for operating the clutch for throwing the machine into and out of gear. Figs. 12 and 13 are perspective views in detail of the receiving and kicking fingers, respectively. Fig. 14 is a view illustrating the connections between the axle and the bearing-wheels. Fig. 15 is an inside view of the axle-nut.

Similar numerals of reference designate corresponding parts throughout the several figures of the drawings.

Referring to the drawings, 1 designates the frame of the herein-described harvester, which comprises, essentially, longitudinal beams 2, said beams being shaped to accommodate the various parts of the mechanism, and at the rear ends of the beams 2 a transverse sleeve 3 is formed, through which passes an axle 4. Bearing-wheels 5 are secured to the ends of the axle 4 by any of the ordinary devices employed in machines analogous to the present one, so that the axle is adapted to rotate when said wheels move forwardly, and loosely mounted upon the axle 4 is a master sprocket-wheel 6.

A clutch 7 is employed for throwing the machine into and out of gear, and one member of said clutch is rigidly secured to the axle 4 and adapted to rotate therewith, the other member of the clutch being carried by the sprocket-wheel 6 and adapted to rotate the latter when the clutch member carried by the axle 4 is rotated. The inner side of the hub of the sprocket-wheel 6 is provided with an annular flange 8, and formed upon the sleeve 3 is a series of spaced keepers 9, provided with transverse passages 10, through which passes an adjusting-bar 11, having at its end which lies adjacent to the flange 8 an L-shaped hook-clamp 12, which clamp is adapted to engage the flange 8, as clearly shown. The opposite end of the adjusting-bar is rabbeted at its upper side, which rabbeted portion is adapted to engage the adjacent keeper 9, and for effecting this engagement of the adjusting-bar 11 a spring 13 is arranged therebeneath and normally urges the adjusting-bar 11 upwardly. A handle 14 is rigidly secured to the adjusting-bar 11 for moving the latter, and it will readily be seen that when said handle is operated so that the hook-clamp 12 may force the sprocket-wheel 6 to engage the member of the clutch which is rigidly secured to the axle 4 the spring 13 will force the rabbeted end of the adjusting-bar 11 upwardly, and hence prevent return of said bar to the position which it occupied previous to the engagement of the sprocket-wheel 6 with the clutch 7. To release the clutch, it is simply necessary to depress the rabbeted end of the adjusting-bar 11, when the latter may be readily passed through the keepers 9 and the sprocket-wheel 6 moved in such a position as to be free from rotation.

Arranged at the forward part of the frame 1 is the mechanism for topping the beets or removing the leaves therefrom, and referring to this mechanism it will be seen that the same comprises a vertically-extending substantially rectangular frame 15, the side bars 16 of which are seated in notches 17, formed in the inner faces of the longitudinal beams 2, said notches 17 being opposite to each other and adapted to permit vertical adjustment of the frame 15. A shaft 18 extends transversely of the frame 15, and mounted upon the end thereof which is at the side of the machine upon which the sprocket-wheel 6 is arranged is a sprocket-wheel 19, a sprocket-chain belt 20 passing over the wheels 6 and 19. Arranged at the lower end of the frame 15 is a series of rotary cutters 21, the latter being preferably formed of steel and having their peripheries sharpened for the purpose of severing the leaves from the beets, the adjacent edges of said cutters lying in such relation to each other that the cutting of the leaves will be positively insured. The cutters 21 are secured to the lower ends of vertically-extending arbors 22, which arbors pass through bearing-sleeves 23, arranged below the side bars 16 and in alinement therewith.

The sleeves 23 are supported by inwardly-extending arms 24, which depend from the central portion of the frame 15, and secured to the upper ends of the arbors 22 is a series of beveled pinions 25, which pinions mesh with beveled pinions 26, mounted upon the transverse shaft 18 within the frame 15. It will thus be seen that as motion is imparted to the shaft 18 from the master sprocket-wheel 6 the same is communicated to the rotary cutters 21 through the beveled pinions 25 and 26, and hence the cutters revolve so as to effectually remove the leaves of the beets as the latter are reached.

A deflector-board 27 is arranged in rear of the frame 15 and suspended therefrom by means of a brace-rod 28, the inner end of the deflector 27 being secured to one of the bearing-sleeves 23. This board receives the leaves of the beets as the same are severed, and said leaves by the centrifugal force of the cutters 21 are thrown to one side of the machine during the passage of the latter, the deflector-board being adapted to guide the leaves to such position.

An upwardly-extending guide-bracket 29 is arranged in front of the frame 15 and has its upper end provided with an aperture 30, through which passes a vertically-projecting guide-rod 31, which is secured to the upper end of the frame 15, and by means of the guide-rod 31 said frame is retained in such relation to the longitudinal beams 2 of the frame 1 that vertical adjustment may be readily effected, brace-rods 32 extending from the apertured portion of the bracket 29 to the beams 2 and serving to hold said bracket in a rigid position.

In order that the cutters 21 may be adjusted vertically, so as to position the same in proper relation to the leaves of the beets for action thereon, a lever 33 is mounted upon a superstructure 34, the latter comprising a series of four upwardly-converging arms 35, and at the upper ends of the rear of said arms 35 is a pair of segmental rack-bars 36, between which extends a transverse bearing-bar 37. Mounted upon this bearing-bar 37 is the lever 33, which is provided with suitable connections for engaging the teeth of the rack-bar 36 at the side of the superstructure 34 adjacent to the sprocket-wheel 6, and extending between the longitudinal beams 2, intermediate the frame 15 and the body of the superstructure 34, is a transverse bearing-bar 38, on which is pivoted a fulcrum-lever 39. The forward end of the fulcrum-lever 39 is connected to the frame 15 by a link 40, and connecting the lower end of the lever 33 with the rear end of the fulcrum-lever 39 is a link 41, so that by manipulating the lever 33 it is apparent that motion will be transmitted therefrom, through the fulcrum-lever 39 and the link connections 40 and 41, to the frame 15, and by adjusting the lever 33 upon the rack-bar 36 it is apparent that the cutters 21 may be retained at any desired height with relation to the beets being operated upon. Arranged in rear of the topping mechanism is the mechanism for removing the beets from the ground, and the same consists of a pair of parallel spaced lifting-boards 42, the forward ends of which are sharpened, so as to readily enter the ground. Arranged at the lower edges of the lifting-boards 42 is a series of oppositely-disposed cutting-fins 43, which fins lie adjacent to the front ends of the boards 42, and said fins serve to loosen the earth, so that the beets may be readily removed therefrom. The lifting-boards 42 are secured at their upper edges and together by a series of arches 44, which arches are bolted or otherwise secured to the boards 42, and it will be observed that said boards at their rear ends are rolled inwardly, as at 45. These rolled portions 45 form a substantially V-shaped space between the lower edges of the lifting-boards, which space is adapted to receive the beets and guide the latter to the rolled portions 45. The arch 44, at the rear ends of the lifting-boards 42, is provided with an upwardly-extending shank 46, through which passes a transverse pin 47, the ends of which are disposed in elongated guides 48, formed in the central portion of a slotted supporting-arm 49, the guides 48 being arranged at each side of the slot of the arm 49. It will thus be seen that the pin 47 may be adjusted longitudinally within the guides 48; but the primary object of the pin 47 is to provide a pivot upon which the lifting-boards 42 may be swung, so that the same may be presented at a proper angle for action on the ground and subsequently lifting the beets. A vertically-extending yoke-frame 50 lies within the superstructure 34, the sides of said frame being disposed in notches 51, which notches are also formed at the inner sides of the beams 2, similar to the notches 17, and positioned at the lower inner faces of the sides of the frame 50 is a series of inwardly-extending studs 52, which studs are adapted to enter perforations 53, formed in the forward ends of the lifting-boards 42, and it will thus be seen that the boards 42 have a pivotal connection with the frame 50. In the action of the machine the lifting-boards 42 are normally inclined, as shown in dotted lines in Fig. 1, and by this inclination the sharpened forward ends of said boards cut into the earth, and the cutting-fins 43 serve to loosen the earth sufficiently, as before stated, for the beets to be lifted by the rolled portions 45 of the lifting-boards. During transportation, however, of the machine the lifting-boards 42 are elevated, so that the sharpened forward ends thereof contact in no wise with the ground. This is effected by means of an adjusting-lever 54, which lever is arranged upon the bearing-bar 37, adjacent to the lever 33, and said lever 54 has a suitable connection with the rack-bar 36, opposite to the rack-bar engaged by said lever 33. The lever 54 is also provided with a segmental rack-bar 55, which engages with teeth 56, formed on the rear face of an upwardly-projecting guide-rod 57, which rod projects upwardly from the upper end of the yoke-frame 50 and passes through the upper end of the superstructure 34. By this connection of the lever 54 with the frame 50 adjustment of the former will serve to either raise or depress the yoke-frame, so that the forward ends of the lifting-boards may be so positioned as to either enter the ground or be free from contact therewith.

Extending from one side of the frame 1 is a rearwardly-projecting supporting-arm 58, through the central portion of which passes the axle 4, and it will be noted that the rear end of said arm 58 connects with a bearing-frame 59, which is also attached to the rear ends of rearwardly-extending divergent arms 60, the latter being connected to the supporting-arm 49. A shaft 61 is journaled in the lower end of the frame 59, and mounted upon one end of said shaft is a sprocket-pinion 62, which pinion is in alinement with the sprocket-wheel 6; but it will be noted at this point that said sprocket-wheel 6 is provided with two series of sprocket-teeth over one of which passes the sprocket-chain belt 20, while passing over the other series is a sprocket-chain belt 63, which chain belt also travels over the sprocket-pinion 62 and around a sprocket-wheel 64, journaled in rear of the pinion 62. The shaft 61 is provided with a series of cranks 65, upon a portion of which is suitably arranged a series of rotary receiving-fingers 66, having their forward ends curved upwardly and inwardly, so that the beets may be readily fed thereon. The other cranks of the series have suitably secured thereon a series of rotary kicking fingers 67, the forward ends of which are bent upwardly, and which fingers operate in a reverse manner to the receiving-fingers 66. The rear ends of the fingers 66 and 67 are bifurcated and have pivoted therein the lower ends of connecting links 68, the upper ends of which are provided with eyes 69, through which passes a bearing-rod 70, said rod forming a hanger for the links 68. The rear ends of the lifting-boards 42 are provided with notches 71, through which the forward ends of the receiving-fingers 66 are adapted to pass when gathering the beets, and projecting from the inner edges of the rolled portions 45 is a series of guard-fingers 72, a series of supplemental guard-fingers 73 projecting from the rear ends of the boards 42 and extending from the upper edges of said boards to the guard-fingers 72. A series of skeleton partition-frames 74 is secured to the bearing-frame 59, and said frames are adapted to separate the receiving and kicking fingers 66 and 67, respectively, from each other; but in addition to this function the upper edges of the frames 74 are slightly curved, so as to form a platform for receiving the beets as the receiving-fingers 66 deposit the latter thereon. During the passage of the beets from the lifting-boards 42 to the curved upper edges of the partitions 74 the earth is removed therefrom; but as the receiving-fingers continue to move rearwardly the same deposit the beets upon the upper edges of the partition-frames 74, where the kicking fingers 67 act thereon. It is obvious that the shaft 61 rotating at a comparatively high rate of speed causes a corresponding movement of the fingers 66 and 67, and as the kicking fingers 67 move rearwardly and contact with the beets upon the frames 74 it is also apparent that the impact of said kicking fingers will be sufficient to throw the beets upon a transversely-operating shuffle-board 75, which is positioned in rear of the upper edges of the skeleton partition-frames 74.

A counter-shaft 76 is arranged in the frame 59, adjacent to the shaft 61, but at right angles thereto, and motion is imparted to said counter-shaft through the medium of a series of beveled pinions 77, mounted upon the shafts 61 and 76. The shaft 76 is provided with a crank 78, to which is connected a link 79, and said link 79 is in turn connected to the lower end of a rock-lever 80. A link 81 is suitably connected to the upper end of the shuffle-board 75 and is also connected to the upper end of the rock-lever 80. By this connection it is apparent that a vibratory movement will be imparted to the shuffle-board 75 when the counter-shaft 76 is rotated, and hence the beets as they are deposited on the shuffle-board will be gradually fed toward the lower end thereof, a guard-frame 82 being positioned in rear of the shuffle-board 75 and at a sufficient height to prevent the beets passing the same as the latter are thrown over upon the shuffle-board by the kicking-fingers 67. The shuffle-board 75 is, however, pivoted at its upper end within a vibrating hinge connection 83, which in turn is pivoted in the frame 59, so that as the rock-lever 80 is operated said hinge connection is vibrated and imparts a steady movement to the shuffle-board 75.

The rear end of the counter-shaft 76 has mounted thereon a grooved pulley 84, and arranged at the opposite side of the frame 59 is a pair of supporting-brackets 85, in which is journaled a conveyer-shaft 86, and mounted upon the rear end of said conveyer-shaft is a grooved pulley 87, over which passes a crossed belt 88, said belt imparting motion to the shaft 86 from the pulley 84 upon the counter-shaft 76. The inner faces of the brackets 85 are provided with lugs 89, and mounted upon these lugs is a series of eyes 90. Connected to the eyes 90 is a conveyer-trough 91, which may be of any suitable construction; but it will be noted that said trough 91 is connected to the eyes 90 by an extensible connection 92. A sprocket-wheel 93 is mounted upon the conveyer-shaft 86, and journaled in the upper end of the trough 91 is a similar wheel 94. A sprocket-chain belt 95 travels over the wheels 93 and 94, and secured to said chain belt is a series of shoes 96, which shoes are rigidly held upon the chain belt by longitudinally-extending braces 97. By means of the extensible connection 92 it is evident that the conveyer-trough 91 may be so adjusted that any slack in the belt 95 may be taken up, so that said belt may be properly operated. By reason of motion being communicated to the conveyer-shaft 86 it will be seen that the beets as the latter are fed into the conveyer from the shuffle-board 75 will be elevated to a wagon or other suitable receptacle which is designed to travel beside the machine. An auxiliary guard-frame 98 is arranged upon one of the arms 60 and designed to prevent the beets falling from the upper edges of the frames 74.

For supporting the rear end of the machine, and more particularly the loading mechanism, a caster-wheel 99 is employed, which caster-wheel is journaled in a suitable frame 100, provided with an eye 101, through which passes a vertical guide-rod 102, passing through alined bearings formed at the rear end of the bearing-frame 59. The guide-rod 102 is rigidly secured in the eye 101, so that when said rod is adjusted vertically the frame 100 may be adjusted in a corresponding manner to provide for elevating or lowering the loading mechanism. In order that this vertical adjustment of the guide-rod 102 may be effected, an adjusting-lever 103 is employed, which lever is pivoted to the rear end of the bearing-frame 59 and has a suitable engagement with a rack-bar 104. Projecting from the lower end of the lever 103 is a bifurcated arm 105, the bifurcation of which receives the vertically-extending guide-rod 102, and it will be noted that said bifurcated end of the arm 105 lies above the eye 101, but below a collar 106, which collar is rigidly secured to the guide-rod 102. By reason of this connection of the arm 105 it is apparent that the rod 102 may be adjusted when the lever 103 is suitably operated.

Extending from the sides of the conveyer-trough 91 is a series of projecting studs 107, to which are secured braces 108, having suitable connections with the frame of the loading mechanism. By reason of these braces it will be seen that the conveyer-trough is always held in an inclined position, so as to properly feed the beets to the wagon or other receptacle.

The forward part of the frame of the machine is supported by a series of steering-wheels 109, which wheels are journaled in frames 110, each of which is provided with an eye 111. The forward ends of the longitudinal beams 2 diverge and are provided with horizontally-disposed sleeves 112, which sleeves are spaced slightly from each other, and rigidly secured in said sleeves 112 is a transversely-extending guide-rod 113. Mounted upon the guide-rod 113 is a shifting bar 114, depending from the ends of which are securing-brackets 115. Each of the securing-brackets 115 is adapted to receive one of the eyes 111, which eyes are pivoted in said brackets, so that the steering-wheels 109 may readily turn for guiding the machine. The upper ends of the brackets 115 are perforated and adapted to receive the guide-rod 113, so that said brackets may have a transverse movement thereon with relation to the frame of the machine. Guides 116 are mounted upon the upper portions of the sleeves 112, which guides receive the shifting bar 114 and retain the latter upon said sleeves, and for the purpose of operating said bar 114 a longitudinally-extending shifting lever 117 is employed, the latter being pivoted intermediate its ends at a point upon one of the beams 2, adjacent to the frame 15. The forward end of the lever 117 is suitably connected to the shifting bar 114, and the rear end passes through a locking-loop 118, which is secured to the frame of the machine. The loop 118 is provided with a series of notches 119, which notches are adapted to receive a projection 120, formed on the lever 117. A spring 121 is secured to the upper side of the lever 117 and is adapted to normally urge the projection 120 into engagement with the notches 119. By manipulating the lever 117, so as to position the same at different points throughout the loop 118, it is quite evident that the shifting bar 114 may be moved upon the guide-rod 113, so that the machine may be properly guided for action upon the rows of beets. A pole 122 is secured to the guide-rod 113 between the sleeves 112, and projecting from the sides of said pole is a series of rearwardly-extending braces 123, which braces are also secured to the guide-rod 113, and suitably secured to the pole 122 is a whiffletree 124 for the purpose of hitching a team to said pole. In order that the leaves may be freed from the earth, so that the same may be properly presented to the rotary cutters 21, a series of spring-fingers 125 is secured to the pole, and by reason of the pole being arranged at substantially the central part of the machine it is apparent that said fingers will act upon the leaves, so that the same may be freed from the dirt.

While it has been stated that any devices of approved construction may be used for so connecting the bearing-wheels 5 with the axle 4 that the latter will rotate when the wheels move forwardly, but be free from rotation during the rear movement of the wheels, we have shown a preferable device for this purpose, and referring thereto it will be observed that the same consists of a flanged cap 126, which is rigidly secured to the axle 4 by a pin or other suitable device, and projecting from the inner side of said cap is a pawl-receiving projection 127. The projection 127, at opposite points thereon, is provided with circular recesses 128, which recesses receive heads 129, formed at the ends of spring-pressed pawls 130, said pawls extending in opposite directions and having their outer ends adapted to engage teeth 131, formed at the inner side of the hubs of the wheels 5. By employing this connection at each end of the axle it is evident that the wheels 5 will cause the latter to rotate when the machine is moving forwardly; but immediately upon the machine moving rearwardly the teeth 131 will slip over the pawls in a manner that is obvious to those familiar with the art.

A seat 132 is mounted upon the slotted supporting-arm 49, and said seat is arranged in such relation to the levers 33, 54, and 117 that the operator of the machine may have the same under his control at all times.

The operation of the herein-described harvester is as follows: As the machine moves forwardly the spring-fingers 125 act upon the leaves of the beets so that the same are freed from the dirt or other accumulations thereon and are adapted to be presented to the rotary cutters 21, so that said leaves may be readily severed from the beets. The rotation of the bearing-wheels 5 imparts motion to the master sprocket-wheel 6 through the clutch 7, and said master-sprocket in turn imparts motion to the shaft 18 through the chain belt 20. This movement of the shaft 18 causes the beveled pinions 25 and 26 to operate and impart rotary movement to the cutters 21. The movement of the cutters is toward each other, and as the leaves are fed therebetween the same are severed from the beets and by the centrifugal force of the cutters carried against the deflector-board 27. By reason of the deflector-board 27 inclining rearwardly and the leaves of the beets being forced against the same by the movement of the cutters 21 the leaves will be carried to one side of the machine, and hence not interfere with the action of the lifting-boards 42 as the latter approach the beets. As previously described, the cutters 21 may be elevated or lowered by means of the lever 33 and its connections with the frame 15, and, as also previously stated, the lifting-boards 42 when the machine is in operation incline downwardly from their rear ends to their forward ends, so that the latter, being sharpened from their extremities to the fins 43, are presented to the earth in such manner that the latter is cut and freed from the beets therein. After the cutters 21 have passed the beets and the latter have passed the fins 43 they enter the V-shaped space between the boards 42 and the rolled portions 45 thereof, and said rolled portions pass beneath the beets. The rolled portions 45 have an elevating action upon the beets, so that during the continued forward movement of the machine said rolled portions will elevate the beets to such an extent as to completely remove them from the ground. During movement of the machine motion is communicated to the loading mechanism by the chain belt 63, and by reason of said belt passing over the sprocket-pinion 62 the shaft 61 is actuated. As the shaft 61 rotates the receiving-fingers 66 pass into the notches 71, where the beets which are at the rear end of the rolled portions 45 are caught thereby and elevated to the curved upper edges of the partition-frames 74 and deposited thereon. The kicking-fingers 67 are simultaneously operated with the receiving-fingers 66, and the beets after being deposited upon the frames 74 are thrown from the latter by said kicking-fingers to the shuffle-board 75. The counter-shaft 76 being actuated by the pinions 77 from the shaft 61 will impart a vibratory movement to the shuffle-board 75 through the medium of the rock-lever 80 and its connections, and hence the beets are caused to gradually pass from the upper end of the shuffle-board to its lower end, where they are deposited in the conveyer 91. The latter elevates the beets to the wagon which is traveling at the side of the machine, and after being received in said wagon the beets are boxed or otherwise suitably disposed of.

To steer the machine, the operator grasps the rear end of the lever 117 and adjusts the same in the loop 118, so as to set the shifting bar 114 in a proper position upon the guide-rod 113; but should the machine at any time be moving so that the beets are not being properly acted upon by the cutters 21 and the lifting-boards 42 the shifting bar 114 may be manipulated so as to adjust the steering-wheels 109 and bring the machine to its proper course. The forward ends of the lifting-boards 42 may be elevated by means of the lever 54 and its connection with the guide-rod 57, and when the machine is not in operation this elevation of the forward ends of said boards is effected, so that the same will in no wise come upon the ground, and as the machine is transported from place to place the working parts thereof may be thrown out of gear with the wheels 5 by simply passing the adjusting-bar 11 through the keepers 9, and thus releasing the master sprocket-wheel 6 from the fixed member of the clutch 7.

The machine constructed as herein shown and described is what is believed to be a preferable embodiment thereof; but it is of course obvious that various changes in the form, proportion, and minor details of construction may be resorted to, and hence we reserve to ourselves the right to change, modify, or vary the construction as falls within the scope of the invention.

Having thus described our invention, what we claim as new, and desire to secure by Letters Patent, is—

1. In a harvester of the class described, a series of rotary cutters, a frame for supporting said cutters, a shaft journaled in said frame, pinions mounted on said shaft and adapted to actuate said cutters, a guide-bracket arranged above said frame, a guide-rod carried by said frame and disposed within said guide-bracket, means for actuating said shaft, and means for adjusting the cutters for positioning the same with proper relation to the beets for action thereon, substantially as described.

2. In a harvester of the class described, a series of lifting-boards for removing the beets from the ground, the forward ends of said boards being sharpened, inwardly-projecting fins carried by said boards on their adjacent edges for loosening the earth around the beets, a yoke-frame pivotally connected to said boards, and means for adjusting said yoke-frame, substantially as described.

3. In a harvester of the class described, a series of parallel lifting-boards, the forward ends of said boards being sharpened to cut the earth around the beets, fins carried by said boards for loosening the earth around the beets, rolled portions formed at the rear ends of said boards and adapted to lift the beets, and means for adjusting the boards at an incline for action upon the ground, substantially as described.

4. In a harvester of the class described, a series of parallel lifting-boards, the forward ends of said boards being sharpened to cut the earth around the beets, fins carried by said boards for loosening the earth around the beets, rolled portions formed at the rear ends of said boards and adapted to lift the beets, a yoke-frame pivotally connected to the boards for adjusting the same at an incline for action upon the ground, and means for adjusting said frame, substantially as described.

5. In a harvester of the class described, a series of parallel lifting-boards, the forward ends of said boards being sharpened to cut the earth around the beets, fins carried by said boards for loosening the earth around the beets, rolled portions formed at the rear ends of said boards and adapted to lift the beets, a yoke-frame pivotally connected to the boards for adjusting the same at an incline for action upon the ground, teeth formed on said yoke-frame, an adjusting-lever for operating the yoke-frame, and a segmental rack-bar carried by said lever and adapted to engage the teeth of the yoke-frame, substantially as described.

6. In a harvester of the class described, a series of lifting-boards for removing the beets from the ground, a yoke-frame pivotally connected to said boards, a superstructure arranged above the lifting-boards, a guide-rod carried by said frame and working through said superstructure, and a lever suitably connected to said guide-rod and adapted for adjusting the yoke-frame, substantially as described.

7. In a harvester of the class described, a series of lifting-boards suitably connected together and adapted to remove the beets from the ground, a yoke-frame pivotally connected to the forward ends of said boards, means for adjusting said yoke-frame, a slotted supporting-arm carried by the machine-frame, a shank arranged at the rear ends of the lifting-boards, guides formed in said slotted supporting-arm, and a pin carried by said shank and seated in said guides for securing the rear ends of the boards to the machine-frame, substantially as described.

8. In a harvester of the class described, a series of lifting-boards for removing the beets from the ground, the forward ends of said boards being sharpened and adapted to cut the earth, fins carried by said boards and adapted to loosen the earth around the beets, a yoke-frame pivotally connected to the lifting-boards, a superstructure arranged above the lifting-boards, a guide-rod carried by the yoke-frame and working in said superstructure, teeth formed on said guide-rod, a lever for adjusting the yoke-frame, a segmental rack-bar carried by said lever and engaging the teeth of the guide-rod, rolled portions formed at the rear ends of the lifting-boards and adapted to lift the beets from the ground, a slotted supporting-arm carried by the machine-frame, guides formed in the slot of said arm, a shank arranged at the rear ends of said lifting-boards, and a pin arranged in said shank and seated in said guides for supporting the rear ends of the lifting-boards, substantially as described.

9. In a harvester of the class described, a series of lifting-boards for removing the beets from the ground, the forward ends of said boards being sharpened to cut the ground, fins carried by said boards for loosening the earth around the beets, a yoke-frame pivotally connected to the forward ends of said boards, means for adjusting said yoke-frame to elevate and lower the forward ends of the lifting-boards, arches connecting the lifting-boards, a slotted supporting-arm carried by the machine-frame, guides formed in said arm, a shank carried by the rear arch, a pin arranged in said shank and seated in said guides for supporting the rear ends of the lifting-boards, rolled portions formed at the rear ends of the lifting-boards and adapted to lift the beets from the ground, and guard-fingers arranged at the rear ends of the lifting-boards, substantially as described.

10. In a harvester of the class described, a series of rotary cutters for topping the beets, a supporting-frame for said cutters, a transverse shaft arranged in said frame, pinions carried by said shaft and adapted to actuate the cutters, means for actuating said shaft, a guide-bracket arranged above the frame, a guide-rod extending upwardly from said frame and passing through said guide-bracket, an operating-lever for adjusting said frame, a fulcrum-lever arranged between said adjusting-lever and the frame, and suitable connections between said adjusting-lever and the fulcrum-lever and the fulcrum-lever and the frame, substantially as described.

11. In a harvester of the class described, a series of receiving-fingers, a conveyer, a series of kicking-fingers for conveying the beets from the receiving-fingers to the conveyer, and means for actuating the kicking and receiving fingers and the conveyer, substantially as described.

12. In a harvester of the class described, a series of receiving-fingers, a series of kicking-fingers acting in conjunction therewith, a conveyer, and a shuffle-board adapted to receive the beets from the kicking-fingers and feed the same to the conveyer, substantially as described.

13. In a harvester of the class described, a series of receiving-fingers, a series of kicking-fingers acting in conjunction therewith, a conveyer, a shuffle-board for receiving the beets from the kicking-fingers and feeding the same to the conveyer, a shaft upon which said receiving and kicking fingers are mounted, suitable connections between said shaft and the conveyer for actuating the latter, and means for actuating said shaft, substantially as described.

14. In a harvester of the class described, a series of receiving-fingers, a series of kicking-fingers rotating in opposite directions to the receiving-fingers, said receiving-fingers being adapted to convey the beets and deposit the same for action thereon by the kicking-fingers, a conveyer, a transversely-arranged vibratory shuffle-board adapted to receive the beets from the kicking-fingers to feed the same to the conveyer, a shaft for actuating the receiving and kicking fingers and the shuffle-board, suitable connections between said shaft and the conveyer for actuating the latter, and means for actuating said shaft, substantially as described.

15. In a harvester of the class described, a series of rotary receiving-fingers, a series of rotary kicking-fingers operating reversely to the receiving-fingers, a shaft for said fingers provided with cranks upon which the same are mounted, a conveyer, a shuffle-board arranged between the kicking-fingers and the conveyer, the kicking-fingers being adapted to throw the beets upon the shuffle-board, suitable connections between said shaft and the conveyer for actuating the latter, and means for actuating said shaft, substantially as described.

16. In a harvester of the class described, a bearing-frame, a shaft journaled therein and provided with a series of cranks, a series of receiving-fingers arranged upon a portion of said cranks, a series of kicking-fingers mounted upon the remaining cranks, a transversely-extending vibratory shuffle-board arranged in rear of said fingers, said kicking-fingers being adapted to throw the beets upon the shuffle-board, a conveyer, suitable connections between said shaft and the conveyer for actuating the latter, and means for actuating said shaft, substantially as described.

17. In a harvester of the class described, a bearing-frame, a shaft journaled therein and provided with a series of cranks, a transversely-extending bearing-rod arranged in said bearing-frame, a series of receiving-fingers carried by a portion of said cranks, a series of kicking-fingers carried by the remaining cranks, said receiving and kicking fingers rotating in opposite directions, links mounted upon the bearing-rod and pivotally connected to the rear ends of said fingers, a series of skeleton partition-frames separating the receiving and kicking fingers, and forming a platform for the reception of the beets, the receiving-fingers being adapted to deliver the beets on said platform, a transversely-extending vibratory shuffle-board arranged in rear of the skeleton partition-frames, the kicking-fingers being adapted to throw the beets from the latter to the shuffle-board, a conveyer for receiving the beets from the shuffle-board, suitable connections between said shaft and the conveyer for actuating the latter, and means for actuating said shaft, substantially as described.

18. In a harvester of the class described, a bearing-frame, a shaft journaled therein and provided with a series of cranks, a series of receiving-fingers carried by a portion of said cranks, a series of kicking-fingers carried by the remaining cranks and rotating in an opposite direction to the receiving-fingers, a series of partition-frames separating the kicking and receiving fingers, a bearing-rod arranged in said bearing-frame, links mounted upon said bearing-rod and pivotally connected to the rear ends of the kicking and receiving fingers, the upper edges of the partition-frames forming a platform for the reception of the beets from the receiving-fingers, a shuffle-board arranged in rear of the upper edges of said frames, the kicking-fingers being adapted to throw the beets upon said shuffle-board, a counter-shaft also journaled in the bearing-frame and provided with a crank, beveled pinions meshing with each other and communicating motion from the first shaft to said counter-shaft, a rock-lever pivoted to the frame and suitably connected to the crank of the counter-shaft, a vibrating hinged connection between the shuffle-board and the bearing-frame, suitable connections between said shuffle-board and the rock-shaft, whereby motion is imparted to the former when the counter-shaft is operated, a pulley mounted upon the counter-shaft, a conveyer suitably connected to the bearing-frame, a pulley mounted upon one of the conveyer-shafts, and a belt traveling over the latter pulley and the pulley mounted on the counter-shaft, whereby motion is imparted to the conveyer from the first-mentioned shaft, substantially as described.

19. In a harvester of the class described, a series of steering-wheels laterally movable, a shifting bar carried by the frame of the machine, said steering-wheels being suitably connected to said shifting bar, and means for shifting said bar, substantially as described.

20. In a harvester of the class described, a series of steering-wheels, a guide-rod, a laterally-movable shifting bar mounted on said guide-rod and adapted to move thereon, and means for shifting said bar, substantially as described.

21. In a harvester of the class described, a series of steering-wheels, a guide-rod, a shifting bar mounted on said guide-rod and adapted to move laterally thereon, and a lever connected to said bar and adapted to shift the same upon the guide-rod, substantially as described.

22. In a harvester of the class described, a series of steering-wheels, suitable frames in which said wheels are journaled, eyes carried by said frames, guides carried by the frame of the machine, a shifting bar mounted in said guides, depending brackets carried by said shifting bar, the eyes of the wheel-frames being suitably secured in said brackets, a guide-rod carried by the machine-frame, said depending brackets being mounted upon said guide-rod, and means for operating the shifting bar laterally, substantially as described.

23. In a harvester of the class described, a series of steering-wheels, suitable frames in which said wheels are journaled, eyes carried by said frames, guides carried by the frame of the machine, a shifting bar mounted in said guides, depending brackets carried by said shifting bar, the eyes of the wheel-frames being suitably secured in said brackets, a guide-rod carried by the machine-frame, said depending brackets being mounted upon said guide-rod, a lever pivoted upon the machine-frame and suitably connected to the shifting bar, a locking-loop also arranged upon the machine-frame and provided with a series of notches, and a spring carried by said lever and adapted to urge the latter into engagement with the notches of the locking-loop, substantially as described.

24. In a harvester of the class described, a caster-wheel, a frame in which said caster-wheel is journaled, an eye carried by said frame, a guide-rod rigidly secured in said eye, a collar rigidly secured to said guide-rod above the eye and spaced therefrom, a lever pivoted to the frame of the machine, a bifurcated arm carried by the said lever, the bifurcated end of said arm lying between the collar and the eye upon the rod, whereby said lever is adapted to adjust the guide-rod vertically, and means for locking the lever in adjusted position, substantially as described.

25. In a harvester of the class described, a master sprocket-wheel mounted upon the axle of the machine, a clutch for locking said sprocket-wheel into engagement with said axle, whereby said wheel is adapted to rotate with said axle, a flange formed on the hub of the sprocket-wheel, a series of keepers carried by the frame of the machine, an adjusting-bar disposed in said keepers and having one of its ends rabbeted, an L-shaped hook-clamp arranged at the end of the adjusting-bar opposite to the rabbeted end thereof and adapted to engage the flange of the sprocket-wheel, and a spring for normally urging the adjusting-bar upwardly, whereby the rabbeted end thereof is adapted to engage one of said keepers to lock the sprocket-wheel in engagement with the clutch, substantially as described.

26. In a harvester of the class described, a master sprocket-wheel mounted upon the axle of the machine, a clutch for locking said sprocket-wheel into engagement with said axle, whereby said wheel is adapted to rotate with said axle, a flange formed on the hub of the sprocket-wheel, a series of keepers carried by the frame of the machine, an adjusting-bar disposed in said keepers and having one of its ends rabbeted, an L-shaped hook-clamp arranged at the end of the adjusting-bar opposite to the rabbeted end thereof and adapted to engage the flange of the sprocket-wheel, a spring for normally urging the adjusting-bar upwardly, whereby the rabbeted end thereof is adapted to engage one of said keepers to lock the sprocket-wheel in engagement with the clutch, and a handle carried by the adjusting-bar, substantially as described.

27. In a harvester of the class described, a series of rotary cutters for topping the beets, means for actuating said cutters, and a deflector-board arranged adjacent to the cutters, whereby the centrifugal force of said cutters is adapted to deflect the tops of the beets to one side of the machine, substantially as described.

28. In a harvester of the class described, mechanism for topping the beets, a shaft for actuating said mechanism, a master power-wheel mounted upon the axle of the machine and adapted to be actuated thereby, mechanism for loading the beets, and suitable gearing between said master power-wheel and the topping mechanism and the power-wheel and the loading mechanism, whereby said mechanisms are actuated by the bearing-wheels of the machine, substantially as described.

29. In a harvester of the class described, mechanism for topping the beets, a shaft for actuating said mechanism, a sprocket-pinion mounted upon said shaft, a master sprocket-wheel mounted upon the axle of the machine and provided with a double series of sprocket-teeth, mechanism for loading the beets, a shaft for actuating said mechanism, a sprocket-pinion mounted upon said shaft, a sprocket-wheel journaled adjacent to said sprocket-pinion, and sprocket-chain belts connecting the master sprocket-wheel with the pinion mounted upon the shaft of the topping mechanism and said master sprocket-wheel with the pinion mounted upon the shaft of the loading mechanism and the sprocket-wheel journaled adjacent thereto, whereby the topping and loading mechanisms are operated by the bearing-wheels of the machine, substantially as described.

30. In a harvester of the class described, mechanism for topping the beets, a shaft for actuating said mechanism, a sprocket-pinion mounted upon said shaft, a master sprocket-wheel mounted upon the axle of the machine and provided with a double series of sprocket-teeth, mechanism for loading the beets, a shaft for actuating said mechanism, a sprocket-pinion mounted upon said shaft, a sprocket-wheel journaled adjacent to said sprocket-pinion, sprocket-chain belts connecting the master sprocket-wheel with the pinion mounted upon the shaft of the topping mechanism and said master sprocket-wheel with the pinion mounted upon the shaft of the loading mechanism and the sprocket-wheel journaled adjacent thereto, whereby the topping and loading mechanisms are operated by the bearing-wheels of the machine, and means for throwing the master sprocket-wheel into and out of gear with the axle of the bearing-wheels, substantially as described.

In testimony whereof we affix our signatures in presence of two witnesses.

GEORGE W. DAVIS.
EUGENE E. EGGLESTON.

Witnesses:
C. H. GRAHAM,
J. E. EGGLESTON.